(12) United States Patent
Deng et al.

(10) Patent No.: US 11,515,530 B2
(45) Date of Patent: Nov. 29, 2022

(54) SILICON-BASED NEGATIVE ELECTRODE MATERIAL, PREPARATION METHOD THEREFOR AND USE THEREOF IN LITHIUM-ION BATTERY

(71) Applicant: BTR NEW MATERIAL GROUP CO., LTD., Guangdong (CN)

(72) Inventors: Zhiqiang Deng, Guangdong (CN);
Chunlei Pang, Guangdong (CN);
Jianguo Ren, Guangdong (CN);
Youyuan Huang, Guangdong (CN);
Min Yue, Guangdong (CN)

(73) Assignee: BTR NEW MATERIAL GROUP CO., LTD., Guangdong (CN)

( * ) Notice: Subject to any disclaimer, the term of this patent is extended or adjusted under 35 U.S.C. 154(b) by 272 days.

(21) Appl. No.: 16/760,579

(22) PCT Filed: Nov. 29, 2018

(86) PCT No.: PCT/CN2018/118102
§ 371 (c)(1),
(2) Date: Apr. 30, 2020

(87) PCT Pub. No.: WO2019/114556
PCT Pub. Date: Jun. 20, 2019

(65) Prior Publication Data
US 2020/0280061 A1    Sep. 3, 2020

(30) Foreign Application Priority Data

Dec. 12, 2017  (CN) .......................... 201711321650.6

(51) Int. Cl.
*H01M 4/38*     (2006.01)
*H01M 10/0525*  (2010.01)
(Continued)

(52) U.S. Cl.
CPC ............. *H01M 4/386* (2013.01); *H01M 4/04* (2013.01); *H01M 4/366* (2013.01); *H01M 4/625* (2013.01);
(Continued)

(58) Field of Classification Search
None
See application file for complete search history.

(56) References Cited

U.S. PATENT DOCUMENTS

2012/0007028 A1   1/2012 Hwang et al.
2018/0159139 A1*  6/2018 Radacsi .............. H01M 4/8663
(Continued)

FOREIGN PATENT DOCUMENTS

CN   102792498      11/2012
CN   105226254   *   1/2016
(Continued)

OTHER PUBLICATIONS

CN105226254 English translation. Li et al. China. Jan. 6, 2016 (Year: 2016).*

(Continued)

*Primary Examiner* — Christopher P Domone
(74) *Attorney, Agent, or Firm* — Barnes & Thornburg LLP; Jeffrey R. Stone

(57) ABSTRACT

A silicon-based negative electrode material, a preparation method therefor and a use thereof in a lithium-ion battery. The silicon-based negative electrode material comprises a silicon-based active material and a composite layer that coats the surface of the silicon-based active material and composes a flexible polymer, flake graphite and a conductive material. The method comprises: 1) dissolving the flexible polymer in a solvent; 2) adding the flake graphite and the conductive material into the flexible polymer solution obtained in step 1) while stirring; 3) adding an anti-
(Continued)

solvent to the mixed coating solution obtained in step 2) and stirring; 4) adding the silicon-based active material to the supersaturated mixed coating solution obtained in step 3) while stirring, and then stirring and separating; and 5) carrying out thermal treatment to obtain the silicon-based negative electrode material.

17 Claims, 1 Drawing Sheet

(51) Int. Cl.
    *H01M 4/36* (2006.01)
    *H01M 4/62* (2006.01)
    *H01M 4/04* (2006.01)
    *B82Y 30/00* (2011.01)
    *H01M 4/02* (2006.01)

(52) U.S. Cl.
    CPC ......... *H01M 10/0525* (2013.01); *B82Y 30/00* (2013.01); *H01M 2004/027* (2013.01)

(56) References Cited

U.S. PATENT DOCUMENTS

2018/0287142 A1* 10/2018 Zhamu .................. H01M 4/622
2019/0115617 A1* 4/2019 Pan ....................... H01M 4/366

FOREIGN PATENT DOCUMENTS

| | | |
|---|---|---|
| CN | 106058167 | 10/2016 |
| CN | 106058209 | 10/2016 |
| CN | 106207120 | 12/2016 |
| CN | 107369835 | 11/2017 |
| CN | 108054368 | 5/2018 |
| JP | 2013522820 A | 6/2013 |
| JP | 2015053165 A | 3/2015 |
| JP | 2016157652 A | 9/2016 |
| JP | 2017088437 A | 5/2017 |
| KR | 20160033639 | 3/2016 |
| KR | 20170033123 A | 3/2017 |
| WO | 2015005117 A1 | 1/2015 |
| WO | 2015073674 A1 | 5/2015 |

OTHER PUBLICATIONS

International Search Report issued in PCT/CN2018/118102, dated Feb. 27, 2019.
Extended European Search Report, dated Jul. 30, 2021 in European Patent Application No. 18889184.0.
Japanese Office Action, dated Aug. 31, 2020, in Japanese Patent Application No. 2019-544835 and its English translation.
Korean Office Action, dated Jun. 12, 2022 in Korean Patent Application No. 10-2020-7018652 and its English translation.

* cited by examiner

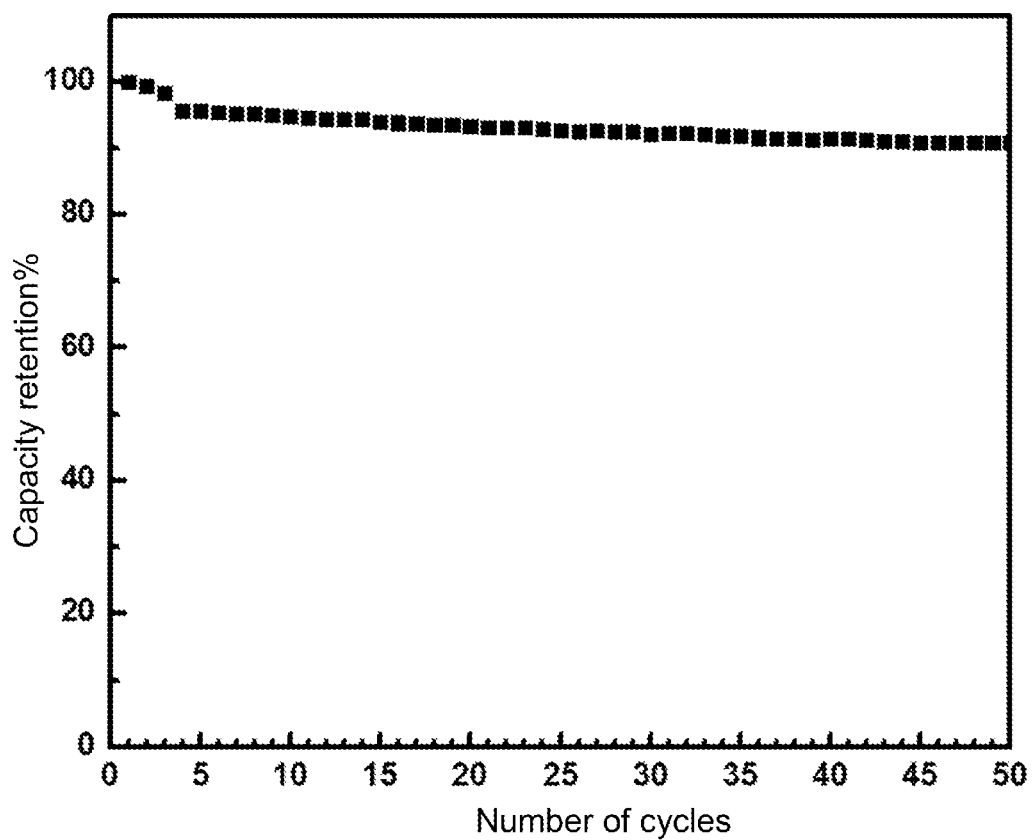

SILICON-BASED NEGATIVE ELECTRODE MATERIAL, PREPARATION METHOD THEREFOR AND USE THEREOF IN LITHIUM-ION BATTERY

TECHNICAL FIELD

The present application relates to the field of lithium ion batteries, and to a silicon-based anode material, a preparation method and a use thereof, for example, to a silicon-based anode material, a preparation method thereof and a use thereof in lithium ion batteries.

BACKGROUND

With the development of lithium ion batteries toward large-scale application fields, performance indexes such as energy density and power density of the lithium ion batteries are required to be further improved. In regard to anode materials, traditional graphite carbon anode materials, having limited specific capacity (372 mAh/g), has been difficult to meet the demands of batteries with high energy density. Therefore, anode materials with high specific capacity have become the current research focus. Silicon-based material is of great interest due to its theoretical specific capacity of up to 4,200 mAh/g. However, severe volume effect and poor conductivity result in low reversible capacity and poor cycle stability of silicon anode material. In order to solve the above-mentioned problems of the silicon-based material, researchers have conducted a great deal of experimental studies, such as conductive polymer coating, carbon coating, compounding with metal oxides, nanocrystallization and porosification.

For instance, patent CN 106229495 A discloses a conductive polymer coated silicon-based anode material and preparation method thereof, with the technical key points comprising: a silicon-based material is coated with a conductive polymer (polythiophene, polyaniline and polypyrrole) through in-situ polymerization, sodium alginate is added to enhance stability, and a three-dimensional network structure is constructed for buffering expansion of silicon material. However, the conductive polymer coated by this method has low conductivity and also unstable conductivity, and is prone to dedoping to lose conductivity, resulting in reduced cycle performance of the material, and the preparation process by in-situ polymerization is complicated. CN 105186003 A discloses a method for preparing anode material of lithium ion battery with high capacity, which comprises: a polymer, a conductive agent and a non-carbon anode material are dispersed into a suitable solvent to form a uniform emulsion, then freezing or spray drying are conducted to obtain a uniform black powder material, and vacuum drying is conducted to obtain a conductive polymer coated high-capacity anode material. Wherein, the volume change of the non-carbon anode during cycling is optimized by utilizing the polymer. However, in the material prepared by this method, the conductive agent which is dispersed around the active material will lose its connection with the active material during cycling, moreover, the polymer has relatively low strength and has failed to improve the expansion of the non-carbon anode material effectively.

Hence, it is still a technical puzzle in the art to develop a silicon anode material having excellent cycle performance and low volume expansion effect as well as a preparation method thereof.

SUMMARY

The following is a brief summary of the subject matter that will be described in greater detail herein. The summary is not intended to be limiting as to the protection scope of the claims.

The present application aims to provide a silicon-based anode material, preparation method thereof and use thereof in lithium ion batteries. The silicon-based anode material according to the present application has excellent electrochemical cycle performance and expansion inhibition and allows prolonged service life of lithium ion batteries. The preparation method according to the present application has a simple and effective process, which is also low cost, easy to be industrialized and green and environment-friendly.

In order to achieve the above-mentioned purposes, the present application adopts the following technical solutions.

In a first aspect, the present application provides a silicon-based anode material, which comprises a silicon-based active material and a composite layer coated on the surface of the silicon-based active material and composed of a flexible polymer and a conductive material, wherein, the conductive material comprises flake graphite and a nano-carbon based material.

In the silicon-based anode material according to the present application, the flake graphite is integrally attached to the surface of the silicon-based active material, the flexible polymer having high strength is coated on the surface of the silicon-based active material and of the flake graphite, and the region that is not attached and coated is filled by nano-carbon based material. The combination of the three materials mentioned-above together constitutes the composite layer, and the synergistic effect of the three materials is capable of inhibiting the expansion of silicon-based material more effectively. Moreover, the silicon-based anode material obtained by coating as mentioned above has high electric conductivity and high conductivity stability. Accordingly, the silicon-based anode material provided by the present application is particularly suitable for lithium ion batteries, and possesses excellent cyclic expansion performance.

The following are optional technical solutions of the present application, but not intended to limit the technical solutions provided by the present application, and the technical objects and advantageous effects of the present application can be better achieved and realized through the following optional technical solutions.

The silicon-based active material has a particle size of 0.5-100 μm, e.g. 0.5 μm, 2 μm, 5 μm, 10 μm, 25 μm, 35 μm, 50 μm, 70 μm, 80 μm, 90 μm or 100 μm, and the like.

Optionally, the composite layer has a thickness of 10-100 nm, e.g. 10 nm, 20 nm, 30 nm, 45 nm, 60 nm, 70 nm, 80 nm, 85 nm, 90 nm, 95 nm or 100 nm, and the like.

Optionally, the silicon-based active material comprises any one of Si, $SiO_x$, or a silicon alloy, or a combination of at least two thereof, wherein $0<x\leq2$. But it is not limited to the above-listed silicon-based active materials, other silicon-based active materials commonly used in the art, such as carbon-coated silicon oxides, may also be used in the present application.

Optionally, the flexible polymer is a natural flexible polymer and/or a synthetic flexible polymer.

The "natural flexible polymer and/or synthetic flexible polymer" as used herein refers to a natural flexible polymer, a synthetic flexible polymer, or a mixture of a natural flexible polymer and a synthetic flexible polymer.

Optionally, the flexible polymer is any one of polyolefin and derivatives thereof, polyvinyl alcohol and derivatives thereof, polyacrylic acid and derivatives thereof, polyamide and derivatives thereof, carboxymethyl cellulose and derivatives thereof, or alginic acid and derivatives thereof, or a combination of at least two thereof, and typical but non-limiting examples of the combinations include: a combination of polyolefin and polyvinyl alcohol, a combination of polyvinyl alcohol and carboxymethyl cellulose, a combination of carboxymethyl cellulose and alginic acid, a combination of polyamide and derivatives of carboxymethyl cellulose, a combination of polyolefin, derivatives of polyolefin, and polyacrylic acid, a combination of polyvinyl alcohol, derivatives of polyamide, and alginic acid, a combination of polyolefin, polyvinyl alcohol, derivatives of polyacrylic acid, polyamide and alginic acid, and the like.

Optionally, the flexible polymer is polyolefin and derivatives thereof, or a combination of polyolefin and derivatives thereof with alginic acid and derivatives thereof.

Optionally, the flexible polymer has a weight average molecular weight of 2,000-1,000,000, e.g. 2,000, 5,000, 10,000, 15,000, 20,000, 30,000, 40,000, 50,000, 60,000, 75,000, 100,000, 200,000, 300,000, 350,000, 400,000, 500,000, 600,000, 650,000, 700,000, 800,000, 900,000 or 1,000,000 and the like, optionally 100,000-500,000.

As an optional technical solution of the anode material according to the present application, the flexible polymer contains a thermal crosslinking functional group (also referred to as a thermally crosslinkable functional group), and the thermal crosslinking functional group comprises any one of epoxy, carboxyl, hydroxyl, amino, double bond or triple bond, or a combination of at least two thereof.

Optionally, the flake graphite is natural flake graphite and/or synthetic flake graphite.

Optionally, the conductive material is a combination of flake graphite and a nano-carbon based material. In the case where the conductive material is just totally a mixture of these two materials, the two materials are better allowed to cooperate with the silicon-based composite material to play a role in inhibiting the expansion of the silicon-based material, which further improves the conductivity and the conductive stability.

The "natural flake graphite and/or synthetic flake graphite" described herein refers to natural flake graphite, synthetic flake graphite or a mixture of natural flake graphite and synthetic flake graphite.

Optionally, the nano-carbon based material comprises any one of conductive graphite, graphene, carbon nanotubes or carbon nanofibers, or a combination of at least two thereof.

Optionally, based on the total mass of the silicon-based active material being 100%, the flexible polymer is present in an amount of 0-10% by mass, exclusive of 0, e.g. 0.5%, 1%, 1.5%, 2%, 3%, 4%, 5%, 6.5%, 8%, 9% or 10% and the like, optionally 3-7%.

Optionally, based on the total mass of the silicon-based active material being 100%, the flake graphite is present in an amount of 0-20% by mass, exclusive of 0, e.g. 0.5%, 1%, 3%, 3.5%, 5%, 6%, 8%, 10%, 12%, 13%, 15%, 16%, 18% or 20% and the like, optionally 5-10%.

Optionally, based on the total mass of the silicon-based active material being 100%, the nano-carbon based material is present in an amount of 0-5% by mass, exclusive of 0, e.g. 0.5%, 1%, 2%, 2.5%, 3%, 4% or 5% and the like, optionally 1-3%.

In a second aspect, the present application provides a preparation method of the silicon-based anode material according to the first aspect, which comprises the following steps:

(1) a flexible polymer is dissolved in a solvent so that a flexible polymer solution is obtained;

(2) a conductive material comprising flake graphite and a nano-carbon based material is added to the flexible polymer solution under stirring so that a mixed coating solution is obtained;

(3) an anti-solvent is added to the mixed coating solution, and stirring is conducted, so that a supersaturated mixed coating solution is obtained;

(4) under stirring, a silicon-based active material is added to the supersaturated mixed coating solution, followed by stirring and separating, so that an anode material precursor is obtained; and (5) the anode material precursor is subjected to heat treatment so that a silicon-based anode material is obtained.

According to the method of the present application, the silicon-based active material is dispersed in the supersaturated solution of the flexible polymer in which the flake graphite and the nano-carbon based material are dispersed, thus the polymer is gradually coated on the surface of the silicon-based active material by utilizing the properties of the supersaturated solution, while the flake graphite and the conductive material dispersed in the solution are attached to the surface of the silicon-based active material by virtue of the traction and binding effects of the polymer.

In the silicon-based anode material prepared by the method according to the present application, the excellent adhesiveness of the flake graphite and the function of filling the gaps by the nano-carbon based material are utilized, so that the coated material has a stable structure, high conductivity and high conductivity stability.

As an optional technical solution of the method according to the present application, the flexible polymer in step (1) contains a thermal crosslinking functional group, which thermal crosslinking functional group comprises any one of epoxy, carboxyl, hydroxyl, amino, double bond or triple bond, or a combination of at least two thereof. In the optional technical solution, the flexible polymer contains a large number of crosslinkable functional groups which is subjected to crosslinking in subsequent heat treatment so that the strength of the coating layer is enhanced to inhibit the expansion of the material during cycling.

Optionally, the solvent in step (1) is any one of water, methanol, ethanol, polypyrrolidone, isopropanol, acetone, petroleum ether, tetrahydrofuran, ethyl acetate, N,N-dimethylacetamide, N,N-dimethylformamide, n-hexane, or a halogenated hydrocarbon, or a combination of at least two thereof.

Optionally, after the flexible polymer is dissolved in the solvent in step (1), stirring is carried out at 25-100° C., e.g. 25° C., 30° C., 40° C., 50° C., 60° C., 70° C., 80° C., 90° C. or 100° C., and the like.

Optionally, the conductive material comprising flake graphite and a nano-carbon based material in step (2) is a combination of the flake graphite and the nano-carbon based material. In the case where the conductive material is just totally a mixture of these two materials, the two materials are better allowed to cooperate with the silicon-based composite material to play a role in inhibiting the expansion of the silicon-based material, which further improves the conductivity and the conductive stability.

Optionally, after the conductive material comprising the flake graphite and the nano-carbon based material is added in the flexible polymer solution in step (2), stirring is continued for 2-4 h, e.g. 2 h, 2.5 h, 3 h, 3.5 h or 4 h, and the like.

Optionally, the anti-solvent in step (3) is a poor solvent for the flexible polymer, and selected from any one of water, methanol, ethanol, polypyrrolidone, isopropanol, acetone, petroleum ether, tetrahydrofuran, ethyl acetate, N,N-dimethylacetamide, N,N-dimethylformamide, n-hexane, or a halogenated hydrocarbon, or a combination of at least two thereof.

Optionally, the stirring duration in step (3) is 1-2 h, e.g. 1 h, 1.2 h, 1.5 h, 1.6 h, 1.8 h or 2 h, and the like.

Optionally, after the silicon-based active material is added to the supersaturated mixed coating solution in step (4), stirring is carried out at 25-80° C. for 2-4 h. The stirring temperature is, e.g. 25° C., 30° C., 40° C., 45° C., 50° C., 60° C., 70° C. or 80° C., and the like; and the stirring duration is, e.g. 2 h, 2.5 h, 3 h, 3.2 h, 3.5 h or 4 h, and the like.

Optionally, the separation mode in step (4) comprises any one of atmospheric pressure filtration, reduced pressure filtration or centrifugation; but is not limited to the above-mentioned separation modes, and other separation modes commonly used in the art to achieve the same effect can also be used in the present application.

Optionally, the heat treatment temperature in step (5) is 100-400° C., e.g. 100° C., 125° C., 150° C., 170° C., 200° C., 220° C., 240° C., 260° C., 300° C., 350° C. or 400° C., and the like, optionally 150-250° C.

Optionally, the heat treatment duration in step (5) is 2-12 h, e.g. 2 h, 4 h, 5 h, 6.5 h, 8 h, 10 h, 11 h or 12 h, and the like.

In the method according to the present application, the anode material precursor obtained in step (4) is a silicon-based material coated by the flake graphite, the nano-carbon based material and the flexible polymer together, and after the heat treatment of step (5), the flexible polymer is crosslinked via the crosslinkable groups, so that the strength of the coating layer is enhanced to inhibit the expansion of the material during cycling.

As an optional technical solution of the method according to the present application, the method comprises the following steps:

(1) a flexible polymer containing a thermal crosslinking functional group is dissolved in a solvent, and stirring is conducted at 25-100° C., so that a flexible polymer solution is obtained;

(2) flake graphite and a nano-carbon based material are added to the flexible polymer solution under stirring, and after the addition is finished, stirring is continued for 2-4 h, so that a mixed coating solution is obtained;

(3) an anti-solvent is added to the mixed coating solution, and stirring is conducted for 1-2 h, so that a supersaturated mixed coating solution is obtained;

(4) under stirring, a silicon-based active material is added to the supersaturated mixed coating solution, and then stirring is conducted at 25-80° C. for 2-4 h, followed by separating, so that an anode material precursor is obtained; and (5) the anode material precursor is subjected to heat treatment at 150-250° C. for 2-12 h so that a silicon-based anode material is obtained;

wherein, the anti-solvent is a poor solvent for the flexible polymer containing a thermal crosslinking functional group.

In a third aspect, the present application provides an anode comprising the silicon-based anode material according to the first aspect.

In a fourth aspect, the present application provides a lithium ion battery comprising the anode according to the third aspect.

As compared to the related art, the present application has the following beneficial effects:

(1) According to the present application, polymer precipitates are coated on the silicon-based active material by utilizing the properties of the supersaturated solution of the polymer, while the flake graphite is firmly attached to the surface of a silicon-based active material and nano-carbon based materials are firmly filled in gaps by virtue of the traction and binding effects of the polymer, maintaining the electric connection in the cyclic expansion process of the silicon-based active material. The expansion of the silicon-based active material can be effectively inhibited through the combined effect of the flake graphite integrally attached to the surface of the silicon-based active material, the polymer having high strength coated on the surface of the silicon-based active material and the nano-carbon based material filled in the gaps. In addition, by the attaching of flake graphite and filling the gaps by the nano-carbon based material, the prepared coated silicon-based anode material has excellent performances and is extremely suitable for lithium ion batteries, and has high conductivity and high conductivity stablility. And the cyclic expansion inhibition property of the silicon-based active material is improved significantly and the service life of the lithium ion batteries is prolonged via the combined effect of flake graphite attaching, flexible polymer coating and nano-carbon based material filling.

(2) The preparation method has advantages of inexpensive raw materials, simple and effective process, mild conditions, low requirements on equipment, low cost and easy large-scale production. Furthermore, the production process is green and environment-friendly with no toxic and harmful intermediate product being generated in the process.

Other aspects will become apparent upon reading and understanding the detailed description and the accompanying drawings.

BRIEF DESCRIPTION OF THE DRAWINGS

FIG. 1 is a graph showing the capacity retention after 50 cycles of a battery comprising the silicon-based anode material for lithium ion batteries obtained in Example 3 of the present application.

DETAILED DESCRIPTION

The present application is described in detail below with reference to specific embodiments and accompanying drawings in order to more clearly explain the purposes, technical solutions and technical effects of the present application.

Example 1

Provided in this example is a silicon-based anode material for lithium ion batteries, which was prepared by the following method:

4 g of polyacrylic acid was dissolved in 100 g of distilled water for sufficiently dissolving at 40° C., then 1 g of carbon nanofibers and 5 g of flake graphite CSG-3 were added thereinto under stirring; after stirring for 2 hours, 200 g of ethanol was added, followed by further stirring for 0.5 hour; thereafter, 90 g of $SiO_x$ (x=1.0) was added thereinto under stirring; after stirring at 60° C. for 2 hours, the mixture was cooled to room temperature, and separated by suction filtration to obtain a material; then the material was placed in a drying oven at 180° C. for heat treatment for 4 hours, and then cooled and taken out, thereby a corresponding $SiO_x$ anode material coated with polyacrylic acid, CSG-3 and carbon nanofibers was obtained, which was the silicon-based anode material for lithium ion batteries.

Example 2

Provided in this example is a silicon-based anode material for lithium ion batteries, which was prepared by the following method:

2.5 g of polyacrylic acid was dissolved in 100 g of distilled water for sufficiently dissolving at 40° C., then 0.5 g of carbon nanotubes and 3 g of flake graphite CSG-3 were added thereinto under stirring; after stirring for 4 hours, 200 g of ethanol was added, followed by further stirring for 0.5 hour; thereafter, 95 g of $SiO_x/C$ (x=1.0) was added thereinto under stirring; after stirring at 60° C. for 2 hours, the mixture was cooled to room temperature, and separated by suction filtration to obtain a material; then the material was placed in a drying oven at 180° C. for heat treatment for 4 hours, and then cooled and taken out, thereby a corresponding $SiO_x/C$ anode material coated with polyacrylic acid, CSG-3 and carbon nanotubes was obtained, which was the silicon-based anode material for lithium ion batteries.

Example 3

Provided in this example is a silicon-based anode material for lithium ion batteries, which was prepared by the following method:

2 g of polyacrylic acid and 1 g of sodium carboxymethylcellulose were dissolved in 100 g of distilled water for sufficiently dissolving at 50° C., then 1 g of graphene and 3 g of flake graphite CSG-3 were added thereinto; after stirring for 4 hours, 200 g of methanol was added, followed by further stirring for 1 hour; thereafter, 90 g of $SiO_x/C$ (x=1.0) was added thereinto; after stirring at 50° C. for 4 hours, the mixture was cooled to room temperature, and separated by centrifugation to obtain a material; then the material was placed in a drying oven at 250° C. for heat treatment for 4 hours, and then cooled and taken out, thereby a corresponding $SiO_x/C$ anode material coated with polyacrylic acid-sodium carboxymethylcellulose, CSG-3 and graphene was obtained, which was the silicon-based anode material for lithium ion batteries.

FIG. 1 is a graph showing the capacity retention after 50 cycles of a battery comprising the silicon-based anode material for lithium ion batteries obtained in this example, and it can be seen from the graph that the capacity retention after 50 cycles of the battery reached 91.2%.

Example 4

Provided in this example is a silicon-based anode material for lithium ion batteries, which was prepared by the following method:

3 g of polyvinyl alcohol was dissolved in 100 g of distilled water for sufficiently dissolving at 90° C., then 1 g of carbon nanotubes and 5 g of flake graphite CSG-3 were added thereinto under stirring; after stirring for 2.5 hours, 100 g of acetone was added, followed by further stirring for 2 hour; thereafter, 100 g of $SiO_x/C$ (x=1.0) was added thereinto under stirring; after stirring at 80° C. for 2.5 hours, the mixture was cooled to room temperature, and separated by suction filtration to obtain a material; then the material was placed in a drying oven at 200° C. for heat treatment for 6 hours, and then cooled and taken out, thereby a corresponding silicon-based anode material for lithium ion batteries was obtained.

Example 5

5 g of alginic acid was dissolved in 150 g of distilled water for sufficiently dissolving at 60° C., then 2 g of conductive graphite and 2 g of flake graphite CSG-3 were added thereinto under stirring; after stirring for 3 hours, 200 g of ethanol was added followed by further stirring for 1.5 hour; thereafter, 100 g of $SiO_x$ (x=1.0) was added thereinto under stirring; after stirring at 35° C. for 4 hours, the mixture was cooled to room temperature, and separated by suction filtration to obtain a material; then the material was placed in a drying oven at 100° C. for heat treatment for 12 hours, and then cooled and taken out, thereby a corresponding silicon-based anode material for lithium ion batteries was obtained.

Example 6

4 g of polyamide was dissolved in a mixed solution of 80 g of ethanol and 20 g of isopropyl alcohol for sufficiently dissolving at 50° C., then 0.5 g of carbon nanofibers and 3 g of flake graphite CSG-3 were added thereinto under stirring; after stirring for 3.5 hours, 150 g of petroleum ether was added, followed by further stirring for 1.5 hour; thereafter, 100 g of $SiO_x/C$ (x=1.0) was added thereinto under stirring; after stirring at 80° C. for 2 hours, the mixture was cooled to room temperature, and separated by suction filtration to obtain a material; then the material was placed in a drying oven at 375° C. for heat treatment for 2 hours, and then cooled and taken out, thereby a corresponding silicon-based anode material for lithium ion batteries was obtained.

Comparative Example 1

A $SiO_x/C$ anode material, where x=1.0.

The anode materials prepared in Examples 1-6 were applied to lithium ion batteries, with Serial No. SI-1, SI-2, SI-3, SI-4, SI-5, and SI-6, respectively. As a reference, a lithium ion battery was prepared using $SiO_x/C$ (x=1.0) of Comparative Example 1 as the anode material, numbered Ref.

The anode materials prepared in Examples 1-6 and the $SiO_x/C$ (x=1.0) of the reference were mixed with sodium carboxymethylcellulose, styrene butadiene rubber, conductive graphite (KS-6) and carbon black (SP) in a ratio of 92:2:2:2, respectively, to prepare a slurry; each slurry was uniformly coated on a copper foil and dried to prepare an anode plate. A button cell was assembled by using the anode plate in an glove box under argon atmosphere, where the separator used was a polypropylene microporous membrane, the electrolyte used was 1 mol/L of lithium hexafluorophosphate (the solvent was a mixed liquor of ethylene carbonate, ethyl methyl carbonate and dimethyl carbonate), and the counter electrode used was a metallic lithium sheet.

A test for 50 cycles was performed on the 4 groups of batteries, wherein the voltage range was 0.005 V-1.5 V, and the current density was set to be 50 mA/g. And the capacity retentions were calculated after the cycle test, and the lithium ion batteries were disassembled for measuring the thicknesses of the anode plates.

Wherein, capacity retention after 50 cycles=discharge capacity at the 50th cycle/discharge capacity at the first cycle*100%, and the results are shown in Table 1; expansion rate of anode electrode plate in thickness after 50 cycles= (thickness after 50 cycles−thickness of uncharged electrode plate)/thickness of uncharged electrode plate*100%, and the results are shown in Table 1.

TABLE 1

Capacity retention and expansion rate of electrode plate of each battery after 50 cycles

| Serial No. | Capacity retention after 50 cycles (%) | Expansion rate of electrode plate after 50 cycles (%) |
|---|---|---|
| SI-1 | 90.3 | 39.2 |
| SI-2 | 90.7 | 38.5 |
| SI-3 | 91.2 | 37.7 |
| SI-4 | 90.8 | 37.9 |
| SI-5 | 89.3 | 39.5 |
| SI-6 | 90.1 | 38.3 |
| Ref | 85.6 | 45.4 |

From the test results in Table 1, with respect to the batteries where the silicon-based material for lithium ion batteries according to the present application was used as the anode active material, the capacity retention and the expansion rate of electrode plate after 50 cycles were both significantly improved, which indicates that the silicon-based material for lithium ion batteries provided by the present application is capable of inhibiting effectively the expansion of the electrode plate and the exfoliation of the active material during electrochemical cycling, thereby significantly improving the cycle performance of lithium ion batteries.

The applicant declares that the examples described in this specification are intended to explain the present application and that the particular materials, formulation proportions and reaction conditions referred above are nothing more than the specific embodies of the materials, formulation proportions and reaction conditions referred in the present application, and are not intended to further limit the present application, that is, it does not mean that the present application must rely on the detailed methods described above to be implemented.

What is claimed is:

1. A silicon-based anode material, comprising a silicon-based active material and a composite layer coated on the surface of the silicon-based active material and composed of a flexible polymer and a conductive material;
   the conductive material comprises flake graphite and a nano-carbon based material;
   wherein based on the total mass of the silicon-based active material being 100%, the flexible polymer is present in an amount of 0-10% by mass, exclusive of 0;
   wherein based on the total mass of the silicon-based active material being 100%, the flake graphite is present in an amount of 0-20% by mass, exclusive of 0; and
   wherein based on the total mass of the silicon-based active material being 100%, the nano-carbon based material is present in an amount of 0-5% by mass, exclusive of 0.

2. The anode material according to claim 1, wherein the silicon-based active material has a particle size of 0.5-100 µm.

3. The anode material according to claim 1, wherein the composite layer has a thickness of 10-100 nm.

4. The anode material according to claim 1, wherein the silicon-based active material comprises any one of Si, $SiO_x$, or a silicon alloy, or a combination of at least two thereof, wherein $0<x\leq 2$.

5. The anode material according to claim 1, wherein the flexible polymer is any one of polyolefin and derivatives thereof, polyvinyl alcohol and derivatives thereof, polyacrylic acid and derivatives thereof, polyamide and derivatives thereof, carboxymethyl cellulose and derivatives thereof, or alginic acid and derivatives thereof, or a combination of at least two thereof, and optionally polyolefin and derivatives thereof.

6. The anode material according to claim 1, wherein the flexible polymer has a weight average molecular weight of 2,000-1,000,000.

7. The anode material according to claim 1, wherein the flexible polymer contains a thermal crosslinking functional group, and the crosslinking functional group comprises any one of epoxy, carboxyl, hydroxyl, amino, double bond or triple bond, or a combination of at least two thereof.

8. The anode material according to claim 1, wherein the conductive material is a combination of the flake graphite and the nano-carbon based material.

9. A preparation method of the silicon-based anode material according to claim 1, comprising the following steps:
   (1) a flexible polymer is dissolved in a solvent so that a flexible polymer solution is obtained;
   (2) a conductive material comprising flake graphite and a nano-carbon based material is added to the flexible polymer solution under stirring so that a mixed coating solution is obtained;
   (3) an anti-solvent is added to the mixed coating solution, and stirring is conducted, so that a supersaturated mixed coating solution is obtained;
   (4) under stirring, a silicon-based active material is added to the supersaturated mixed coating solution, followed by stirring and separating, so that an anode material precursor is obtained; and
   (5) the anode material precursor is subjected to heat treatment so that the silicon-based anode material is obtained.

10. The method according to claim 9, wherein the conductive material comprising flake graphite and a nano-carbon based material in step (2) is a combination of the flake graphite and the nano-carbon based material.

11. The method according to claim 9, wherein the flexible polymer in step (1) contains a thermal crosslinking functional group, and the thermal crosslinking functional group comprises any one of epoxy, carboxyl, hydroxyl, amino, double bond or triple bond, or a combination of at least two thereof.

12. The method according to claim 9, wherein the solvent of step (1) is any one of water, methanol, ethanol, polypyrrolidone, isopropanol, acetone, petroleum ether, tetrahydrofuran, ethyl acetate, N,N-dimethylacetamide, N,N-dimethylformamide, n-hexane, or a halogenated hydrocarbon, or a combination of at least two thereof.

13. The method according to claim 9, wherein the anti-solvent in step (3) is a poor solvent for the flexible polymer, and selected from any one of water, methanol, ethanol, polypyrrolidone, isopropanol, acetone, petroleum ether, tetrahydrofuran, ethyl acetate, N,N-dimethylacetamide, N,N-dimethylformamide, n-hexane, or a halogenated hydrocarbon, or a combination of at least two thereof.

14. The method according to claim 9, wherein the heat treatment temperature in step (5) is 100-400° C.

15. The method according to claim 9, wherein it comprises the following steps:

(1) the flexible polymer containing a thermal crosslinking functional group is dissolved in the solvent, and stirring is conducted at 25-100° C., so that a flexible polymer solution is obtained;
(2) the flake graphite and the nano-carbon based material are added to the flexible polymer solution under stirring, and after the addition is finished, stirring is continued for 2-4 h, so that a mixed coating solution is obtained;
(3) the anti-solvent is added to the mixed coating solution, and stirring is conducted for 1-2 h, so that the supersaturated mixed coating solution is obtained;
(4) under stirring, a silicon-based active material is added to the supersaturated mixed coating solution, and then stirring is conducted at 25-80° C. for 2-4 h followed by separating, so that the anode material precursor is obtained; and
(5) the anode material precursor is subjected to heat treatment at 150-250° C. for 2-12 h so that the silicon-based anode material is obtained;
wherein, the anti-solvent is a poor solvent for the flexible polymer containing a thermal crosslinking functional group, the poor solvent is selected from any one of water, methanol, ethanol, polypyrrolidone, isopropanol, acetone, petroleum ether, tetrahydrofuran, ethyl acetate, N,N-dimethylacetamide, N,N-dimethylformamide, n-hexane, or a halogenated hydrocarbon, or a combination of at least two thereof.

16. An anode comprising the silicon-based anode material according to claim 1.

17. A lithium ion battery comprising the anode according to claim 16.

* * * * *